United States Patent [19]
Whyte

[11] 3,881,491
[45] May 6, 1975

[54] SELF-INFLATING STRUCTURE
[75] Inventor: David Denzil Whyte, Wyoming, Ohio
[73] Assignee: The Procter & Gamble Company, Cincinnati, Ohio
[22] Filed: Mar. 29, 1974
[21] Appl. No.: 456,510

[52] U.S. Cl. ............... 128/287; 128/290 R; 161/127
[51] Int. Cl. .......................................... A61f 13/16
[58] Field of Search .... 128/284, 287, 290 R, 290 P, 128/290 B; 9/321; 161/127; 156/156

[56] References Cited
UNITED STATES PATENTS

| | | | |
|---|---|---|---|
| 1,112,186 | 9/1914 | Andersen | 9/321 |
| 1,771,730 | 7/1930 | Marcks | 9/321 |
| 3,004,269 | 10/1961 | Dillier | 9/321 |
| 3,282,533 | 11/1966 | Spain | 161/17 |
| 3,812,001 | 5/1974 | Ryan | 128/296 |

Primary Examiner—Richard A. Gaudet
Assistant Examiner—Henry S. Layton
Attorney, Agent, or Firm—Thomas G. Slone; John V. Gorman; Richard C. Witte

[57] ABSTRACT

A self-inflating structure wherein some gas evolving material or reagent is sealed. The structure comprises a wall of semipermeable material which is substantially pervious to molecules of an activator material and substantially impervious to free molecules of an evolved or product-of-reaction gas. Such free molecules of gas are provided when molecules of activator material interact or react with the gas evolving material. Upon exposing the outside of the semipermeable wall of the structure to molecules of activator material, activator molecules permeate the structure wherein such activator molecules interact with the gas evolving material to provide free molecules of evolved gas or a product-of-reaction gas whereby the structure becomes inflated by the evolved gas. Such self-inflating structures are also disclosed in combination with absorbent materials to provide absorbent products having low pre-inflation bulk. Such absorbent products include disposable diapers having substantially higher ratios of absorption capacity to weight of absorbent material than otherwise.

4 Claims, 11 Drawing Figures

SELF-INFLATING STRUCTURE

FIELD OF THE INVENTION

This invention relates to providing self-inflating structures and related products having relatively low bulk until activated and inflated. Such products include but are not limited to life preservers, disposable diapers, bed pads, and the like.

BACKGROUND OF THE INVENTION

Auto-inflatable structures per se are not new. For instance, a Temperature Actuated Inflation Device is disclosed in U.S. Pat. No. 3,268,184 issued Aug. 23, 1966 to Mr. Allan M. Biggar et al. Also, life preservers which are inflated upon being immersed in water by gas released from pressurized cartridges are known to be old. None of the known prior art discloses, however, such plural-compartment self-inflating structures as provided by the present invention which compartments are individually inflated at the point of use at the time of need as a dependent function of being used.

SUMMARY OF THE PRESENT INVENTION

The nature and substance of the instant invention will be more readily appreciated after giving consideration to its major aims and purposes. The principal objects of the invention are recited in the ensuing paragraphs in order to provide a better appreciation of its important aspects prior to describing the details of a preferred embodiment and other embodiments in later portions of this description.

A major object of the present invention is providing a self-inflating structure which will become inflated upon being permeated by molecules of an activator material.

Another object of the present invention is providing a self-inflating structure as described above which is activated by being wetted as by water.

Still another object of the present invention is providing a self-inflating structure comprising a plurality of self-inflating sealed compartments such as bubbles or pillows.

Yet still another object of the present invention is providing a composite absorbent structure having a relatively low bulk prior to being wetted, and which has a relatively high ratio of absorption capacity to weight of absorbent material.

Yet another object of the present invention is providing a disposable diaper having a relatively low bulk prior to being wetted, and which has a relatively high ratio of adsorption capacity to weight of absorbent material.

These and other objects of the present invention are achieved by providing a self-inflating structure comprising an inflatable sealed compartment such as a pillow or bubble, and a quantity of gas evolving material disposed within the compartment. The compartment has a wall composed of semipermeable material which is substantially pervious to molecules of an activator material and substantially impervious to molecules of an evolved gas. Upon exposing the exterior of the semipermeable wall to molecules of activator material, some activator molecules permeate the structure wherein they interact with the gas evolving material to provide free molecules of evolved gas whereby the compartment becomes inflated. Such self-inflating structures are used in combination with absorbent materials to provide absorbent products having relatively low bulk until wetted, and which products have relatively high ratios of absorption capacity to weight of absorbent material.

BRIEF DESCRIPTION OF THE DRAWINGS

While the specification concludes with claims particularly pointing out and distinctly claiming the subject matter regarded as forming the present invention, it is believed the invention will be better understood from the following description taken in connection with the accompanying drawings in which:

DESCRIPTION OF THE PREFERRED EMBODIMENT

Figure 1:
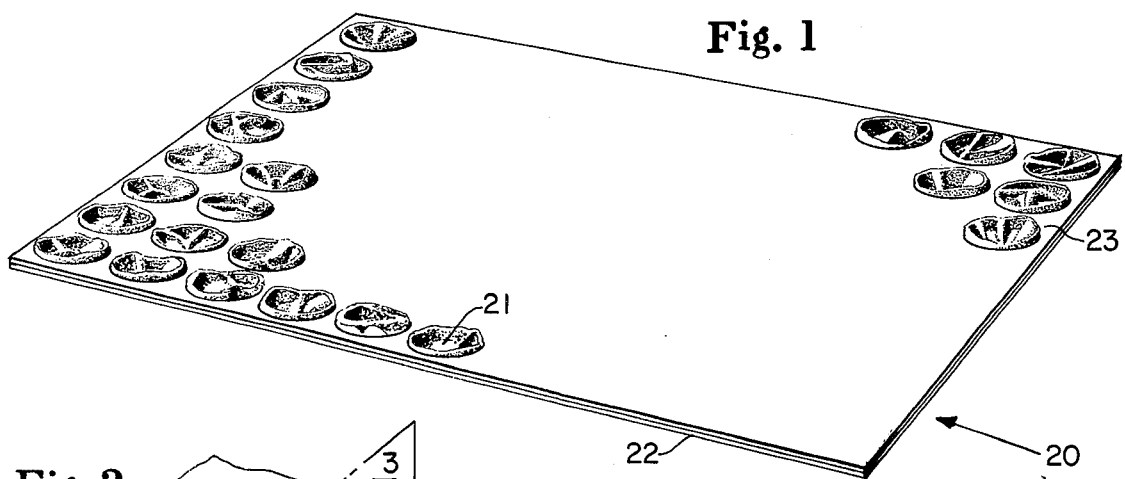
FIG. 1 is a perspective view of a sheet of material comprising a plurality of self-inflating pillow structures.
Figure 2:
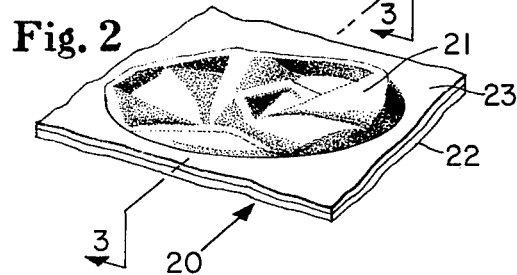
FIG. 2 is a fragmentary enlarged scale perspective view of one self-inflating pillow structure of the sheet of material shown in FIG. 1.
Figure 3:
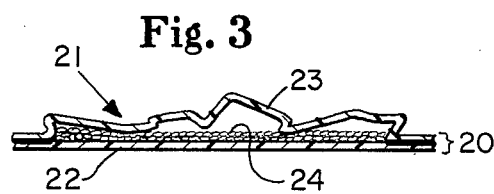
FIG. 3 is a sectional view of the self-inflating pillow structure taken along line 3—3 of FIG. 2.

The self-inflating structure 20, FIG. 1, is a preferred embodiment of the present invention which structure comprises a plurality of spaced, individually self-inflating pillows or bubbles 21. Self-inflating structure 20 is a laminate comprising two thermoplastic films: a plain lamina 22; and an embossed lamina 23. Embossed lamina 23 is so embossed that unembossed areas are disposed intermediate spaced embossed areas. Self-inflating structure 20 is formed by sealingly securing the unembossed areas of lamina 23 to adjacent areas of plain lamina 22 while the embossments of the embossed lamina are substantially collapsed, and by sealing within each substantially collapsed embossment, a quantity of gas evolving material such as reagent 24, FIG. 3. Thus, when the thermoplastic laminae are secured together as by fusing or thermowelding, the spaced embossments become a plurality of substantially collapsed, inflatable pillows 21 which are disposed in spaced relation.

Figure 4:
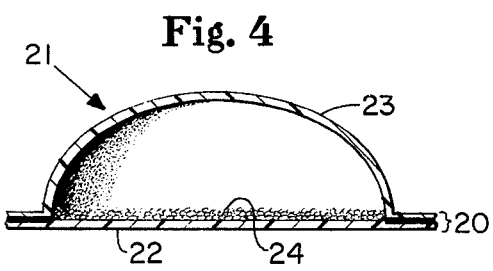
FIG. 4 is a sectional view of the self-inflating pillow structure of FIG. 3 after being inflated.

At least one of the laminae, either plain lamina 22 or embossed lamina 23 comprises semipermeable material which is substantially pervious to molecules of an activator material and substantially impervious to molecules of an evolved or product of reaction gas. For instance, by making embossed lamina 23 of material which is substantially pervious to water molecules, and substantially impervious to carbon dioxide molecules, and by placing a quantity of material 24 in each collapsed pillow 21 which material will release carbon dioxide when acted upon by water molecules, each pillow 21 of structure 20 become inflated independently as indicated in FIG. 4.

The time required to inflate self-inflating embodiments of the present invention which embodiments comprise a semipermeable wall is a dependent function of the relative permeability of the semipermeable wall to molecules of activator material, and to the degree and nature of activator material contact with the outside surface of the semipermeable wall.

Whereas some embodiments of the present invention such as a life perserver would necessarily have to inflate quickly upon being immersed in water, it would not generally be desirable for inflation to occur merely due to exposure to or storage in high humidity environments. Indeed, where inflation of self-inflating products is sought to be achieved by ambient humidity (without immersion), it is believed that products would need to be hermetically sealed until used.

The following examples illustrate different inflation characteristics of embodiments of the present invention which differences are precipitated by using different semipermeable wall materials. Although all of the structures illustrated in the examples were activated by water and all were inflated by carbon dioxide produced by water reacting with powdered potassium bicarbonate and citric acid, it is not intended to thereby limit the present invention to water activated or carbon dioxide inflated self-inflating structures, or to self-inflating structures containing potassium bicarbonate and citric acid powders. Indeed, either sodium bicarbonate or potassium bicarbonate can be used in combination with a powdered acid selected from the group consisting of citric acid, tartaric acid, terephthalic acid, salicylic acid, polymaleic acid, and ethylenediamin tetra acetic acid to provide carbon dioxide when wetted. Of these, the combinations comprising citric acid tartaric acid, or terephtalic acid are substantially more active with respect to liberating carbon dioxide from sodium bicarbonate or potassium bicarbonate than the other combinations.

EXAMPLE 1

Some substantially flat pouches were formed of 1 mil Nylon 6 film. Small quantities of potassium bicarbonate and citric acid powders were placed in each pouch after which each pouch was heat sealed. After being held against moist sponges, there was very little indication of puffing or inflation within five minutes. Then, the pouches were immersed in water. There was definite puffing to form firm inflated pillows in less than 1 minute.

EXAMPLE 2

Flattened pouches measuring approximately 1 inch square were formed of 1 mil polyvinylchloride. Again, small quantities of potassium bicarbonate and citric acid powders were sealed in each pouch. The pouches were placed in warm water. Noticeable puffing occurred within 5 minutes and the pouches were firmly inflated after 15 minutes.

EXAMPLE 3

Pouches approximately 1 inch square were formed from 2 mil Rohm & Haas high Acrylonitrile barrier film, a material which has good barrier properties with respect to carbon dioxide and which is substantially pervious to water. Again, small quantities of powdered potassium bicarbonate and citric acid were sealed in each pouch. Noticeable puffing of each pouch occurred after 5 minutes when held between wet sponges.

METHOD OF CALCULATING QUANTITY OF REAGENT REQUIRED

For specific embodiments of the present invention such as providing pillows 21 having predetermined volumes at predetermined pressures, the weight of gas evolving material or reagent 24 can be calculated. For instance, for embodiments containing powdered citric acid and potassium bicarbonate, their weights can be calculated in the following manner which assumes that citric acid powder reacts with water molecules to form hydrogen ions which, in turn, react with the potassium bicarbonate to form carbon dioxide.

Assume, prior to inflation, a substantially collapsed pillow 21 has a volume $V_1$ cubic centimeters filled with air at a pressure of $P_1$ psia, and that after inflation the pillow has a volume $V_2$ cubic centimeters filled with the original air and reaction-generated carbon dioxide at a pressure $P_2$ psia and temperature $T_2$ degrees Rankine.

The number $N_2$ of standard cubic centimeters of air plus carbon dioxide required at the standard pressure of 14.7 psia and the standard temperature of 492 degrees Rankine is determined by the equation $N_2 = V_2 (P_2/14.7) (492/T_2)$ cubic centimeters The number $N_1$ of standard cubic centimeters of $V_1$ (air) is determined by the equation $N_1 = V_1 (P_1/14.7) (492/T_1)$ cubic centimeters Therefore, the number $N_{CO2}$ of standard cubic centimeters of carbon dioxide required to effect the desired inflation is $N_{CO2} = (N_2 - N_1)$ cubic centimeters Utilizing the fact that a gram molecular weight of any gas will have a volume of 22,400 standard cubic centimeters, and assuming one carbon atom of each carbon dioxide molecule required will be provided by each molecule of potassium bicarbonate, $KHCO_3$, and using one-hundred-and-eleven-one-hundredths (100.11) grams as the gram molecular weight of potassium bicarbonate, the weight in grams of potassium bicarbonate required is $W_{KHCO3} = N_{CO2}/22,400 \ (100.11)$ grams In the same general manner but assuming each molecule of citric acid will provide two hydrogen ions resulting in the liberation of two molecules of carbon dioxide gas, and using 192.12 grams as the gram molecular weight of citric acid powder, the weight in grams of citric acid required is $W_{Citric\ Acid} = N_{CO2}/22,400 \ (96.06)$ grams

SAMPLE CALCULATION

Referring to the above Method of Calculating Quantity of Reagent Required and assuming the following $V_1 = 1$ cc of Air
$V_2 = 5$ cc
$T_1 = T_2 = 532°R.$ $P_1 = 14.7$ psia
$P_2 = 15.7$ psia The values of $N_1$, $N_2$, $N_{CO2}$, $W_{KHCO3}$, and $W_{Citric\ Acid}$ are:

$N_1 = 1\ (492/532) = 0.925$ cc Air at STP
$N_2 = 5\ (15.7/14.7)\ (492/532) = 4.939$ cc at STP
$N_{CO2} = 4.014$ cc $CO_2$ at STP
$W_{KHCO3} = 4.014/22,400\ (100.11) = 0.0179$ gm.
$W_{Citric\ Acid} = 4.014/22,400\ (96.06) = .0172$ gm.

ABSORBENT EMBODIMENTS OF THE PRESENT INVENTION

Figure 6:
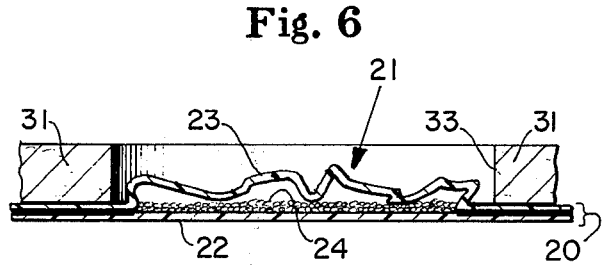
FIG. 6 is a sectional view taken along line 6—6 of FIG. 5.
Figure 7:
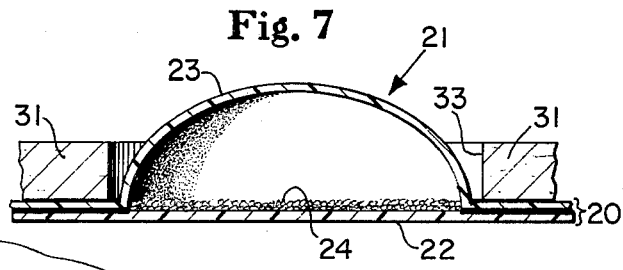
FIG. 7 is a sectional view of the pillow structure shown in FIG. 6 after being inflated.
Figure 5:
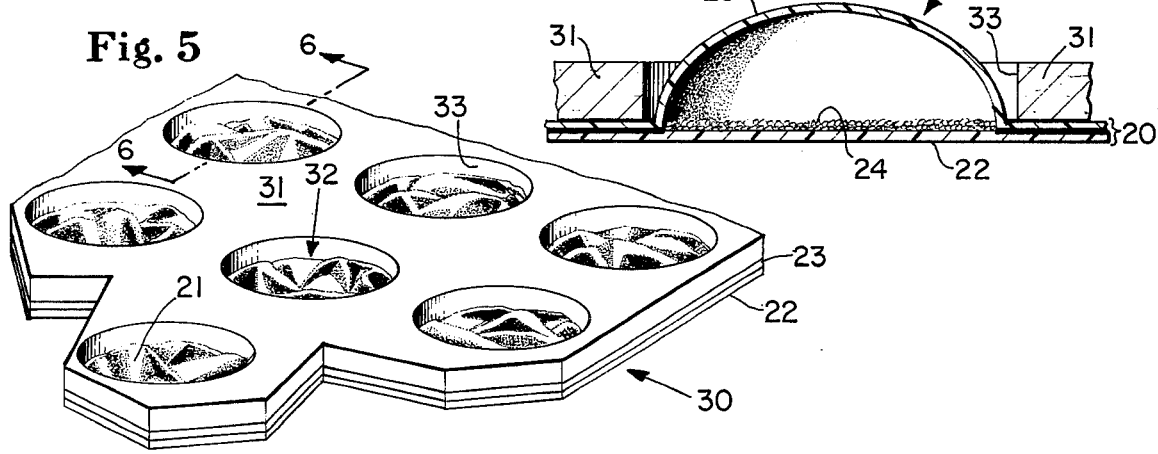
FIG. 5 is a perspective view of a fragment of a sheet of material comprising self-inflating pillow structures and a pad of absorbent material having apertures in it which apertures are in registration with the self-inflating pillow structures.

FIG. 5 is a perspective view of a fragment of an absorbent composite structure 30 comprising a self-inflating pillow structure 20, FIG. 7, in combination with a pad 31 of absorbent material having a plurality of spaced apertures 32 through it which apertures 32 are defined by walls 33. The apertures 32 are so disposed in pad 31 that they are in registration with discrete pillows 21 of the self-inflating structure 20. FIG. 6 shows a cross-sectional view of a portion of composite structure 30 including one pillow 21 prior to being inflated, and FIG. 7 shows the same cross-section after pillow 21 has been inflated.

Absorbent composite structures 30, FIG. 5, comprising self-inflating structures 20 and absorbent pads 31 are particularly well suited for products such as bed pads and disposable diapers because they have low bulk prior to being inflated (activated) while enabling, when inflated, the absorbent material, due in part to its inherent resiliency, to absorb relatively large quantities of liquid as opposed to the amount of liquid such absorbent material could absorb if compressed under the weight of a bed patient, or a sitting or lying infant. Such products indeed have high ratios of absorption capacity to the weight of absorbent material incorporated in them as opposed to similar products not incorporating inflated or inflatable pillow structures. Accordingly, in absorbent composite structures as disclosed herein, the fluid handling function resides in the absorbent material of pad 31 whereas the function of supporting the weight of the user resides in the pillows 21 of the self-inflating structure 20 after such pillows are inflated.

As described hereinbefore with respect to the self-inflating structure 20, FIG. 1, the self-inflating pillow structure 20 of absorbent structure 30, FIG. 5, may be a laminate comprising a plain (unembossed) lamina 22 and an embossed lamina 23 which are sealingly secured together to form a plurality of spaced, substantially collapsed pillows 21 having a semipermeable wall, and within which pillows 21 is sealed a quantity of gas-evolving material 24, FIGS. 6 and 7. However, whereas non-absorbent products comprising self-inflating embodiments of the present invention can have any wall composed of semipermeable material, the composite structures 30, FIGS. 5 through 7, require that the wall adjacent absorbent pad 31 be of semipermeable material. That is, for composite structures 30 comprising laminated self-inflating structures 20, embossed lamina 23 must be of semipermeable material which is substantially pervious to the liquid sought to be absorbed in pad 31, and substantially impervious to gas evolved within pillows 21 by the interaction of such liquid which permeates lamina 23 with the gas evolving material 24 disposed within pillows 21.

When composite structure 30, FIG. 5, is configured for use as a bed pad, for instance, a substantially impervious plain lamina 22 prevents fluids such as urine from soaking the bedding disposed subjacent the bed pad while the embossed lamina 23 of semipermeable material enables inflation of pillows 21 to occur. Thus, the user's body weight is supported by inflated pillows 21, after being wetted, whereby pad 31 of absorbent material can absorb substantially more liquid than when compressed by the user's body weight. The greater absorption capacity is also due in part to the expansion of pad 31 due to the inherent resiliency of most absorbent materials when the weight of the user is raised above pad 31 by inflating the pillows 21.

The size, shape and positioning of pillows 21 of self-inflating structures 20 will depend primarily upon the desired properties of the ultimate products. Although FIGS. 4 and 7 indicate pillows which are essentially domeshape bubbles, it will be apparent to persons skilled in the art that a broad variety of cross sectional shapes could be used. In any event, inasmuch as the primary advantage of the instant structure is its enhanced absorbency under external load, it is advantageous to maintain sufficient supporting ability in the inflatable structure to resist collapse under loads of a size which are likely to be applied to the product during use.

Suitable absorbent materials for absorbent pads 31 include essentially any hydrophilic material whose shape can be adapted to provide the apertured configuration with respect to the self-inflating bubble structure. For example, suitable absorbent materials include a plurality of superposed plys of creped cellulose wadding and/or hydrophilic fiber aggregates prepared by either wet laying or air laying procedures well known in the art, and/or hydrophilic foams as disclosed in U.S. Pat. No. 3,794,029 issued Feb. 26, 1974 to Mr. Bernard A. Dulle. However, low density air laid materials are a preferred class of absorbent material for use in composite absorbent structures 30, FIGS. 5 through 7.

DISPOSABLE DIAPER EMBODIMENT

Figure 8:
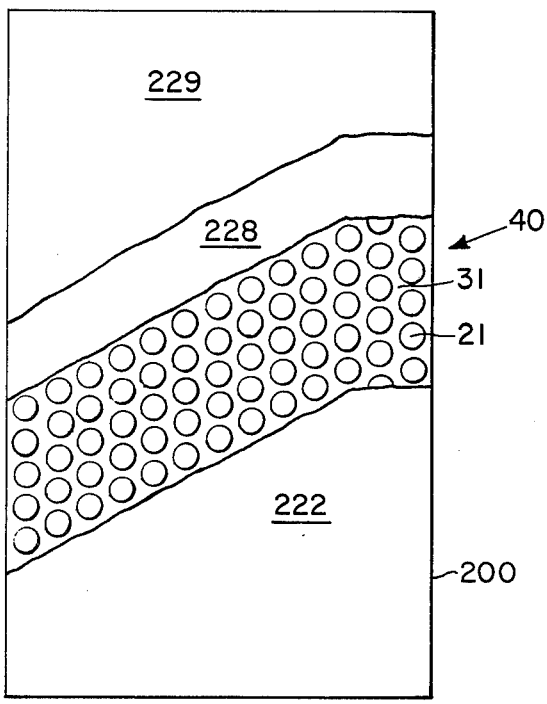
FIG. 8 is a partially cut away, plan view of a disposable diaper comprising a plurality of spaced self-inflating pillow structures in registration with apertures in an absorbent pad.
Figure 11:
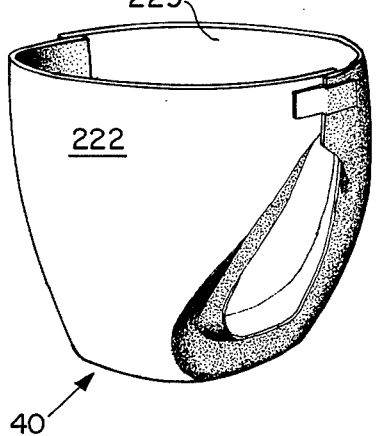
FIG. 11 is a perspective view of a disposable diaper formed into the configuration it would have when secured to an infant.
Figure 9:
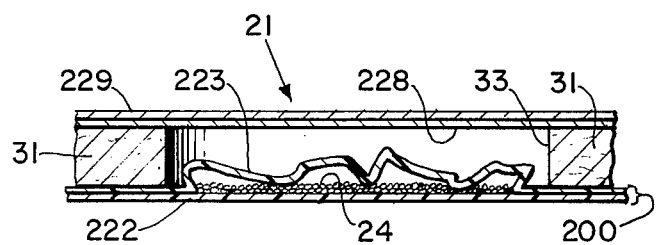
FIG. 9 is a fragmentary cross sectional view through a self-inflating pillow structure of the disposable diapers shown in FIG. 8 prior to the pillow structure being inflated.

A disposable diaper embodiment of the present invention is shown in FIG. 8, which diaper 40 comprises a laminated back sheet 200 comprising a substantially impervious lamina 222, FIG. 9, and a semipermeable lamina 223, an absorbent pad 31, a hydrophilic wicking sheet 228, and a hydrophobic top sheet 229.

Referring to FIG. 9, a cross sectional view of a fragmentary portion of the disposable diaper 40 of FIG. 8 comprising one self-inflatable pillow 21 is shown in enlarged scale. Because of the natural resilience of absorbent pads 31, when a user's body weight is applied to the top of this structure, it is compressed sufficiently to place the down wardly facing surface of the wicking sheet 228 in contact with the upwardly facing surface of laminas 23 defining the substantially collapsed pillow 21. Then, upon wetting of the product from the upwardly facing side, the wicking sheet distributes moisture across a relatively large surface of the portion of laminas 223 defining pillows 21 whereupon moisture permeates the wall of lamina 223 and reacts with the gas evolving material 24 to cause the release of carbon dioxide which then inflates pillows 21 to the configuration shown in FIG. 10. Thus, the body weight of the user becomes supported by the inflated pillows 21 whereupon the resilience of absorbent pad 31 causes it to expand whereby its absorption capacity is substantially increased over its absorption capacity when compressed by the body weight of the user.

Figure 10:
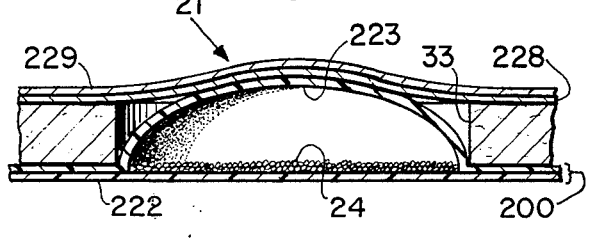
FIG. 10 is a cross sectional view of the fragmentary pillow structure shown in FIG. 9 after being inflated.

FIG. 10 is a perspective view of the disposable diaper 40 shown in FIG. 8 indicating the cinfiguration of the diaper when applied to an infant.

While particular embodiments of the present invention have been illustrated and described, it will be obvious to those skilled in the art that various changes and modifications can be made without departing from the spirit and scope of the invention. It is intended, therefore, to cover in the appended claims all such changes and modifications that are within the scope of this invention.

What is claimed is:

1. A disposable diaper comprising a self-inflating pillow structured laminated backsheet, an absorbent pad, a wicking sheet of hydrophilic material, and a topsheet of porous hydrophobic material, said absorbent pad being disposed intermediate said backsheet and said wicking sheet, and said wicking sheet being disposed intermediate said absorbent pad and said top sheet, said laminated backsheet comprising a plain lamina of substantially water impermeable thermoplastic film, an embossed lamina of semipermeable thermoplastic film which is substantially water permeable, and a predetermined amount of water-reactive gas-evolving reagent, said embossed lamina having a plurality of pillow forming embossments formed therein which are spaced by unembossed areas of said embossed lamina, said pillows being formed by sealingly securing said unembossed areas of said embossed lamina to adjacent portions of said plain lamina while said embossments are substantially collapsed and with a predetermined quantity of said reagent disposed within each said embossment, said absorbent pad having a plurality of spaced apertures therethrough which are so spaced and configured to accommodate said pillows, said absorbent pad being secured to said embossed lamina of said laminated backsheet with said pillows in registration with said apertures whereby portions of said absorbent pad surround each said pillow and said pillows extend through said apertures when inflated by gas evolved by said reagent when water permeates said embossments of said embossed portions of said pillows formed from said embossed lamina and when said water reacts with said reagent.

2. The disposable diaper of claim 1 wherein said semipermeable thermoplastic film is substantially impermeable to carbon dioxide and said reagent comprises material which will react with water to evolve carbon dioxide.

3. The disposable diaper of claim 2 wherein said reagent comprises a predetermined quantity of a powdered acid selected from the group consisting of citric acid, tartaric acid, terephthalic acid, salicylic acid, polymaleic acid, and ethylenediamin tetra acetic acid in combination with a predetermined amount of bicarbonate selected from the group consisting of sodium bicarbonate and potassium bicarbonate.

4. The disposable diaper of claim 2 wherein said reagent comprises predetermined weights of potassium bicarbonate and citric acid powders.

* * * * *